(12) United States Patent
Fraidlin et al.

(10) Patent No.: US 6,317,341 B1
(45) Date of Patent: Nov. 13, 2001

(54) SWITCHING CIRCUIT, METHOD OF OPERATION THEREOF AND SINGLE STAGE POWER FACTOR CORRECTOR EMPLOYING THE SAME

(76) Inventors: Simon Fraidlin, 4512 Chesterwood Dr., Plano, TX (US) 75093; Anatoliy Polikarpov, 2530 E. Meadows, Apartment M, Mesquite, TX (US) 75150

( * ) Notice: Subject to any disclaimer, the term of this patent is extended or adjusted under 35 U.S.C. 154(b) by 0 days.

(21) Appl. No.: 09/711,245

(22) Filed: Nov. 9, 2000

(51) Int. Cl.[7] .......................... H02M 7/122; H02M 3/335
(52) U.S. Cl. ...................... 363/56.09; 363/21.04
(58) Field of Search ............................ 363/16, 20, 21.01, 363/21.02, 21.03, 21.04, 55, 56.01, 56.09, 95, 97, 131

(56) References Cited

U.S. PATENT DOCUMENTS

| | | | |
|---|---|---|---|
| 5,303,138 | * | 4/1994 | Rozman ................................. 363/21 |
| 5,883,795 | * | 3/1999 | Farrington ............................ 363/21 |
| 6,061,254 | * | 5/2000 | Takegami ............................ 363/21 |
| 6,069,803 | * | 5/2000 | Cross ..................................... 363/21 |

* cited by examiner

*Primary Examiner*—Matthew Nguyen

(57) ABSTRACT

A switching circuit, a method of processing power and a single stage power factor corrector employing the switching circuit or the method. In one embodiment, the switching circuit includes: (1) a power switch coupled to a primary winding of a transformer; and (2) an active clamp coupled to the power switch. The active clamp includes: (2a) series-coupled first and second capacitors, coupled across the power switch and the primary winding, having opposing polarities thereacross, and (2b) a clamping switch coupled to a node between the series-coupled first and second capacitors. The clamping switch opens to allow energy stored in the first capacitor to be transferred to an output of the power converter via the second capacitor. The clamping switch further closes to allow energy stored in the second capacitor to be transferred to the output.

28 Claims, 6 Drawing Sheets

SWITCHING CIRCUIT, METHOD OF OPERATION THEREOF AND SINGLE STAGE POWER FACTOR CORRECTOR EMPLOYING THE SAME

TECHNICAL FIELD OF THE INVENTION

The present invention is directed, in general, to power conversion and, more specifically, to a switching circuit, a method of operation thereof, and a single stage power factor corrector employing the switching circuit or the method.

BACKGROUND OF THE INVENTION

A power converter is a power processing circuit that converts an input voltage or current source waveform into a specified output voltage or current waveform. A switched-mode power converter is a frequently employed power converter that converts an input voltage waveform into a specified output voltage waveform. A power factor corrector is one example of a switched-mode power converter that is typically employed in off-line applications wherein power factor correction at the input and a stable, regulated voltage at the output are desired.

Power factor correctors generally employ a two stage topology, including a boost converter and a DC-DC converter. The boost converter generally includes a boost inductor and a power switch coupled thereto. The boost converter further includes a rectifying diode coupled to a node between the boost inductor and the power switch. The boost converter still further includes an output capacitor coupled across an output of the boost converter. The output capacitor is usually large to ensure a constant output voltage. The boost converter generally provides adequate power factor correction. Power factor is defined as a ratio of the actual power delivered to the load to a product of the voltage and current at the input of the boost converter.

An output voltage of the boost converter is always greater than the input voltage (e.g., a voltage of the AC source). The DC-DC converter, therefore, is employed to scale the output voltage of the boost converter down to a voltage required by a load. The DC-DC converter may employ any of the commonly known topologies, depending on such factors as the amount of power to be processed and the required efficiency.

The use of the boost converter in combination with the DC-DC converter generally results in lower efficiencies due, in part, to losses experienced in both the boost converter and in the DC-DC converter. A single stage power converter was developed to reduce the number of stages required to perform power factor correction and to provide a DC output voltage of a level employable by the load. Available single stage power converter topologies, however, require the use of a post regulator to maintain output voltage regulation. The post regulator stage, however, is also subject to losses and may reduce the overall efficiency of the single stage power converter employing the post regulator.

Accordingly, what is needed in the art is a switching circuit and method of processing power for a power converter that overcomes the deficiencies of the prior art.

SUMMARY OF THE INVENTION

To address the above-discussed deficiencies of the prior art, the present invention provides a switching circuit, a method of processing power, and a single stage power factor corrector employing the switching circuit or the method. In one embodiment, the switching circuit includes: (1) a power switch coupled to a primary winding of a transformer; and (2) an active clamp coupled to the power switch. The active clamp includes: (2a) series-coupled first and second capacitors, coupled across the power switch and the primary winding, having opposing polarities thereacross, and (2b) a clamping switch coupled to a node between the series-coupled first and second capacitors. The clamping switch opens to allow energy stored in the first capacitor to be transferred to an output of the power converter via the second capacitor. The clamping switch closes to allow energy stored in the second capacitor to be transferred to the output.

The present invention introduces, in one aspect, the concept of coupling first and second capacitors across a power switch and primary winding of a power converter. The first and second capacitors are oriented such that their polarities are opposing. Energy stored in the first capacitor may be transferred to an output of the power converter via the second capacitor when a clamping switched coupled to the first and second capacitors is open. Energy stored in the second capacitor may then be transferred to the output when the clamping switch is closed.

In one embodiment of the present invention, the switching circuit may be employed as a part of an AC-DC single stage power factor corrector, and the first capacitor is substantially larger than the second capacitor. The first capacitor may store the energy required to maintain output regulation during a trough in the AC input power. In an alternative embodiment, the switching circuit may be employed as a part of a DC-DC power converter, and the first and second capacitors may be about the same size.

In one embodiment of the present invention, the active clamp includes an input inductor. The second capacitor and the input inductor may thus form a resonant circuit to regulate an input current of the power converter. In a related embodiment, the input inductor and the first and second capacitors cooperate to deliver an adequate amount of energy to the primary winding to maintain output regulation of the power converter. In another related embodiment, the input inductor and the first and second capacitors cooperate to allow the input inductor to operate with continuous current therethrough.

In one embodiment of the present invention, the active clamp further includes a zero voltage switching circuit, coupled across the clamping switch, that enables zero voltage switching of the clamping switch. The zero voltage switching circuit may include: (1) series-coupled first and second diodes; (2) an auxiliary winding of the transformer coupled to a node between the series-coupled first and second diodes; and (3) an auxiliary inductor and an auxiliary capacitor coupled in series with the auxiliary winding. In an alternative embodiment, the zero voltage switching circuit may include: (1) a first diode; (2) an auxiliary winding of the transformer coupled in series to the first diode; (3) a second :L diode coupled between the auxiliary winding and a node between the clamping switch and the first capacitor; and (4) a series-coupled auxiliary inductor and auxiliary capacitor coupled across the second diode.

In one embodiment of the present invention, the power switch and the clamping switch are complementarily switched. The power switch may be conducting during a D portion of a duty cycle, while the clamping switch may be conducting during a (1-D) portion of the duty cycle.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
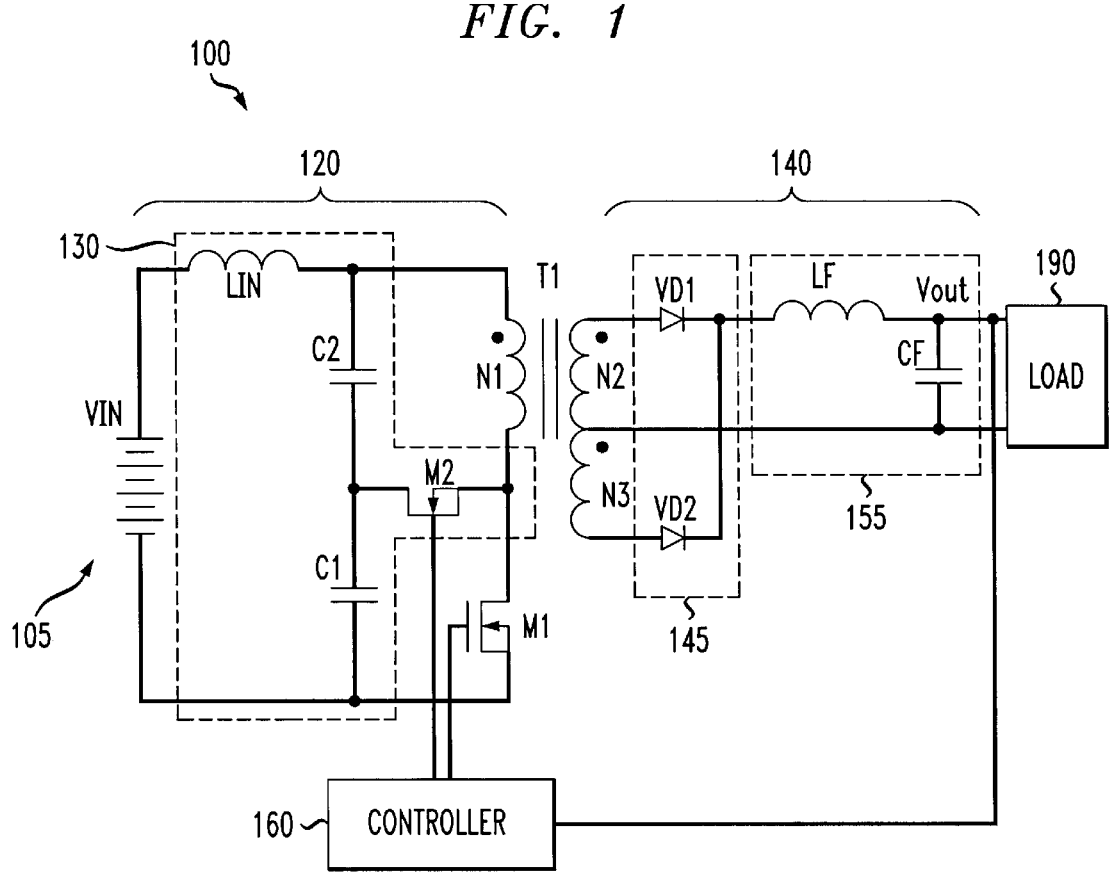
FIG. 1 illustrates a schematic diagram of an embodiment of a DC-DC power converter constructed in accordance with the principles of the present invention.

Referring initially to FIG. 1, illustrated is a schematic diagram of an embodiment of a DC-DC power converter 100 constructed n accordance with the principles of the present invention. The power converter 100 has an input couplable to a source of DC power 105 (having an input voltage Vin) and an output couplable to a load 190. The power converter 100 includes a switching circuit 120 coupled to a primary winding N1 of a transformer T1. The power converter 100 further includes an output circuit 140 coupled to secondary windings N2, N3 of the transformer T1. A controller 160 monitors the output voltage Vout and operates the switching circuit 120 to maintain regulation of the output voltage Vout despite variations in the input voltage Vin and the load 190.

In the illustrated embodiment, the switching circuit 120 includes a power switch M1 series-coupled to the primary winding N1. The switching circuit 120 further includes an active clamp 130 coupled to the power switch M1. The active clamp 130 includes series-coupled first and second capacitors C1, C2, having opposing polarities thereacross. The series-coupled first and second capacitors C1, C2 are coupled across the power switch M1 and the primary winding N1. Since the power converter 100 is configured to receive DC power, the first and second capacitors C1, C2 may be about the same size. In other embodiments wherein the power converter is configured to receive AC power, the first capacitor C1 may be substantially larger than the second capacitor C2 to provide power to the output circuit 140 during a trough in the AC voltage.

The active clamp 130 further includes a clamping switch M2 coupled to a node between the series-coupled first and second capacitors C1, C2. The active clamp 130 still further includes an input inductor Lin coupled between the source of DC power 105 and the primary winding N1. In the illustrated embodiment, the power switch M1 and the clamping switch M2 are metal oxide semiconductor field effect transistors (MOSFETs). Of course, other controllable switches, such as bipolar junction transistors (BJTs) and gallium arsenide field-effect transistors (GaAsFETs), are well within the broad scope of the present invention.

The output circuit 140 includes an output rectifier 145 having first and second rectifying diodes VD1, VD2 coupled to the secondary windings N2, N3, respectively. The output circuit 140 further includes an output filter 155 having an output inductor LF and an output capacitor CF. Of course, other output circuits may be employed and remain well within the scope of the present invention.

The DC-DC power converter 100 operates as follows. The controller 160 modulates the power switch M1 to regulate the output voltage Vout of the DC-DC power converter 100. For an interval D (of a duty cycle) the power switch M1 is closed (conducting) to transfer power from the source of DC power 105 to the primary winding N1. Energy stored in the first capacitor C1 flows through the second capacitor C2 and to the primary winding N1. The energy from the first capacitor C1 thus charges the second capacitor C2 during this interval. Then, for an interval 1-D (of the duty cycle), the power switch M1 is open (non-conducting) and the clamping switch M2 is closed. Energy stored in the second capacitor C2 now flows through the clamping switch M2 and to the primary winding N1. The controller 160 monitors the output voltage Vout and adjusts the duty cycles of the power switch M1 and the clamping switch M2 to regulate the output voltage Vout.

Figure 2:
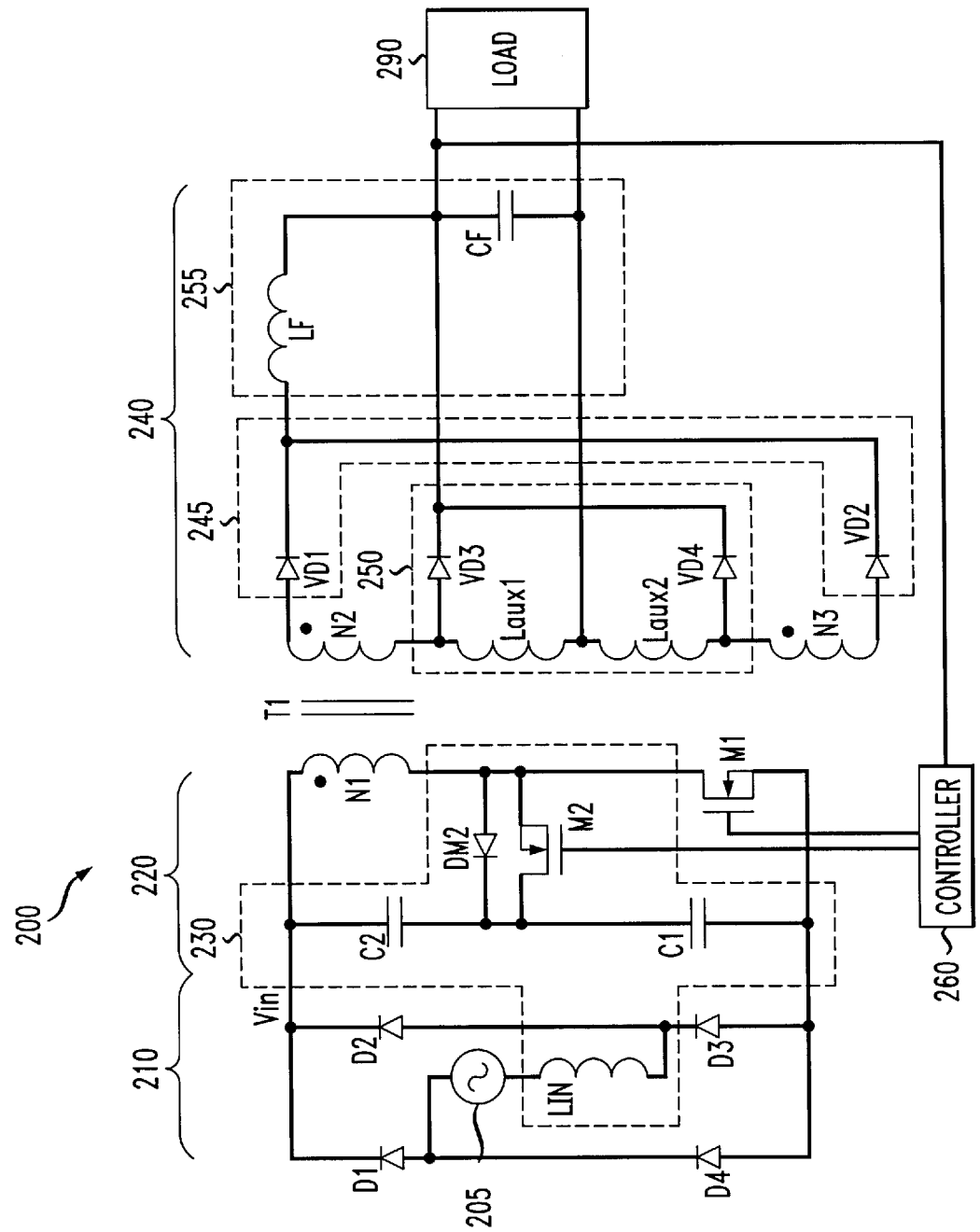
FIG. 2 illustrates a schematic diagram of an embodiment of a single stage power factor corrector constructed in accordance with the principles of the present invention.

Turning now to FIG. 2, illustrated is a schematic diagram of an embodiment of a single stage power factor corrector 200 constructed in accordance with the principles of the present invention. The power factor corrector 200 has an input couplable to a source of AC power 205 and an output couplable to a load 290.

The power factor corrector 200 includes an input rectifier 210 (e.g., a full bridge rectifier) that rectifies AC power (from the source of AC power 205). The power factor corrector 200 further includes a switching circuit 220 coupled between the input rectifier 210 and a primary winding N1 of a transformer T1. The power factor corrector 200 further includes an output circuit 240 coupled to first and second secondary windings N2, N3 of the transformer T1. A controller 260 monitors an output voltage Vout (or an output current) at the output of the power factor corrector 200 and operates the switching circuit 220 to regulate the output of the power factor corrector 200. The controller 260 further operates the switching circuit 220 to correct a power factor of the AC power. A shape of the input current may thus be substantially proportional to the input voltage from the source of AC power 205.

The switching circuit 220 includes a power switch M1 series-coupled to the primary winding N1 and an active clamp 230 coupled to the power switch M1. The active clamp 230 includes series-coupled first and second capacitors C1, C2, having opposing polarities thereacross. The series-coupled first and second capacitors C1, C2 are coupled across the power switch M1 and the primary winding N1. Since the power factor corrector 200 is configured to receive rectified AC power from the input rectifier 210, the first capacitor C1 is substantially larger than the second capacitor C2 to provide power to the output circuit 240 during a trough in the rectified AC voltage (i.e., when the input AC power is low). The active clamp 230 further includes a clamping switch M2 (having a body diode DM2) coupled to a node between the first and second capacitors C1, C2. The active clamp 230 still further includes an input inductor Lin that, in the illustrated embodiment, is coupled to the source of AC power 205 (before the input rectifier 210).

The output circuit 240 includes an output rectifier 245 having first and second rectifying diodes VD1, VD2 coupled to the first and second secondary windings N2, N3, respectively. The output circuit 240 further includes an auxiliary circuit 250 coupled to the output rectifier 245. In the illustrated embodiment, the auxiliary circuit 250 includes first and second auxiliary inductors Laux1, Laux2 series-coupled between the first and second secondary windings N2, N3. The auxiliary circuit 250 further includes third and fourth rectifying diodes VD3, VD4 coupled to the first and second auxiliary inductors Laux1, Laux2, respectively. The output circuit 240 further includes an output filter 255 having an output inductor LF and an output capacitor CF. Of course, other output circuits may be employed and remain well within the scope of the present invention.

The power factor corrector 200 operates as follows. The input rectifier 210 rectifies the AC power from the source of AC power 205 to provide rectified AC power to the switching circuit 220. The controller 260 modulates the power and clamping switches M1, M2 to regulate the output voltage Vout and to provide power factor correction. For an interval D, the power switch M1 is closed to transfer the rectified AC power from the input rectifier 210 to the primary winding N1. Then, for an interval 1-D, the power switch M1 is open and the clamping switch M2 is closed to allow current that was flowing in the primary winding M1 to charge the first capacitor C1.

During a trough of the AC power, energy that was stored in the first capacitor C1 flows through the second capacitor C2 and to the primary winding N1 during the interval D. The energy from the first capacitor C1 thus charges the second capacitor C2. Then, for the interval 1-D, the power switch M1 is open and the clamping switch M2 is closed. Energy stored in the second capacitor C2 (during the interval D) is now discharged through the clamping switch M2 to be transferred to the primary winding N1. The first and second capacitors C1, C2 thus cooperate to provide energy to the output circuit 240 when the AC power is low. The first capacitor C1 is advantageously selected such that an adequate amount of energy may be transferred to the primary winding N1 and the output circuit 240 to maintain output regulation of the power factor corrector 200 and to allow the input inductor Lin to operate with continuous current therethrough. Values of the second capacitor C2 and the input inductor Lin may be selected in accordance with the following equation:

$$f = \frac{K}{2\pi\sqrt{LC_2}} \quad (1)$$

wherein f is an operating frequency of the power factor corrector 200 (i.e., a switching frequency of the power switch M1) and $K \geq 1$.

In the output circuit 240, an output current flows through the first secondary winding N2, the first rectifying diode VD1 (which is conducting), the filter inductor LF, the filter capacitor CF and the first auxiliary inductor Laux1 during the interval D. Then, at the start of the interval 1-D, the second rectifying diode VD2 begins to conduct. In the absence of the auxiliary circuit 250, a reverse recovery of the first rectifying diode VD1, in conjunction with the conduction of the second rectifying diode VD2, would have resulted in an undesirable spike of high current through the output circuit 240. The auxiliary circuit 250 of the present invention, however, provides a path for current through the second rectifying diode VD2. As the second rectifying diode VD2 begins to conduct, a current flows through the second secondary winding N3, the second rectifying diode VD2, the first rectifying diode VD1 (in the direction of the reverse recovery of the first rectifying diode VD1), the first secondary winding N2, the third rectifying diode VD3, the filter capacitor CF, the second auxiliary inductor Laux2 and back to the second secondary winding N3. Since a current through the second auxiliary inductor Laux2 is initially about zero, the presence of the second auxiliary inductor Laux2 in the current path will cause the reverse recovery current (through the first rectifying diode VD1) to decrease. After reverse recovery, the first rectifying diode VD1 turns off. Energy that was stored in the first auxiliary inductor Laux1 now flows to the output via the third rectifying diode VD3. The auxiliary circuit 250 thus advantageously takes the reverse recovery energy, which would otherwise be flowing back to the transformer T1 and the switching circuit 220, and redirects it to the output of the power factor corrector 200.

Figure 3A:
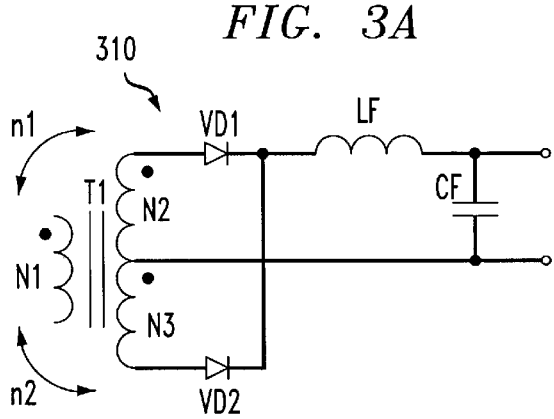
FIGS. 3A–3E illustrate schematic diagrams of various embodiments of output circuits employable with a switching circuit and single stage power corrector constructed in accordance with the principles of the present invention.
Figure 3B:
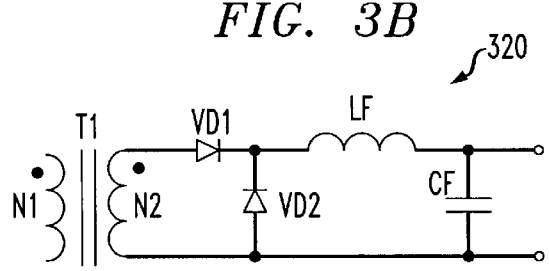
Figure 3C:
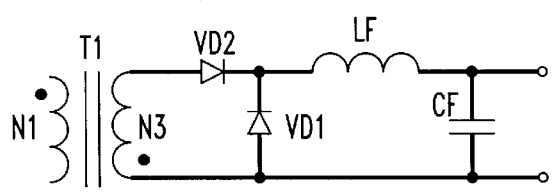
Figure 3D:
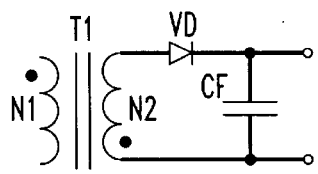
Figure 3E:
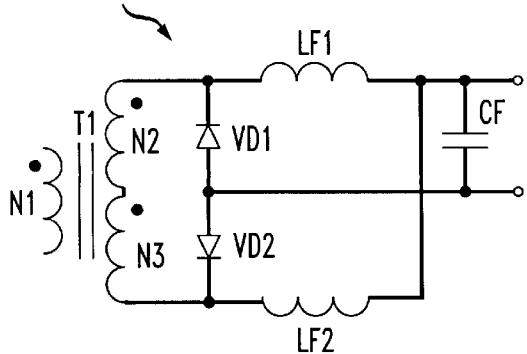

Turning now to FIGS. 3A–3E, illustrated are schematic diagrams of various embodiments of output circuits employable with a switching circuit and single stage power factor corrector constructed according to the principles of the present invention. More specifically, FIG. 3A illustrates a conventional full wave (forward+flyback) output circuit 310, FIG. 3B illustrates a conventional forward output circuit 320, FIG. 3C illustrates a conventional flyback output circuit 330, FIG. 3D illustrates a variation of the conventional flyback output circuit 340 and FIG. 3E illustrates a current-doubler output circuit 350. Those skilled in the pertinent art are familiar with the output circuits 310, 320, 330, 340, 350. Of course, other output circuits may also be employed with the switching circuit and the single stage power factor corrector according to the principles of the present invention. With respect to the conventional full wave output circuit 310, those skilled in the pertinent art will realize that a first turns ratio nl (between a primary winding N1 and a first secondary winding N2) and a second turns ratio n2 (between the primary winding N1 and a second secondary winding N3) may not necessarily be equal.

Figure 4B:
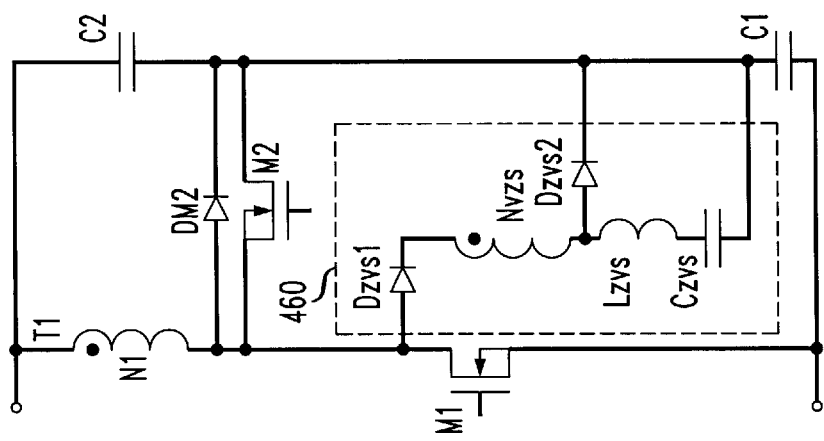
FIGS. 4A–4B illustrate schematic diagrams of embodiments of switching circuits constructed in accordance with the principles of the present invention.
Figure 4A:
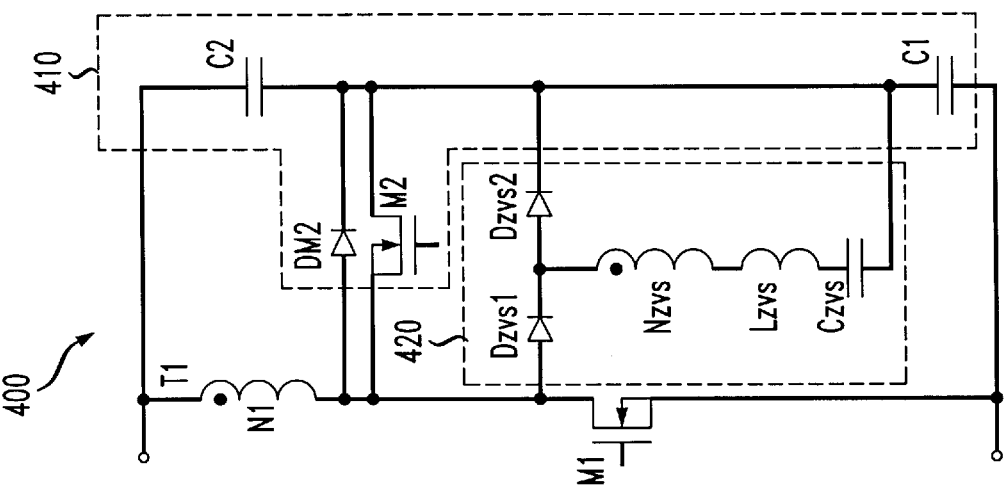

Turning now to FIG. 4A, illustrated is a schematic diagram of an embodiment of a switching circuit 400 constructed in accordance with the principles of the present invention. The switching circuit 400 includes a power switch M1 series-coupled to a primary winding N1 of a transformer T1. The switching circuit 400 further includes an active clamp 410 coupled to the power switch M1. The active clamp 410 includes series-coupled first and second capacitors C1, C2, having opposing polarities thereacross, coupled across the power switch M1 and the primary winding N1. The active clamp 410 further includes a clamping switch M2 (having a body diode DM2) coupled to a node between the first and second capacitors C1, C2.

During an interval 1-D, current flowing through the clamping switch M2 actually flows through the body diode DM2 of the clamping switch M2. Since the current is not actually flowing through the clamping switch M2, the current is generally not sufficiently controlled to provide for zero voltage switching of the clamping switch M2. The switching circuit 400, therefore, advantageously includes a zero voltage switching circuit 420. In the illustrated embodiment, the zero voltage switching circuit 420 includes series-coupled first and second diodes Dzvs1, Dzvs2. The zero voltage switching circuit 420 further includes a zvs winding (auxiliary winding) Nzvs of the transformer T1. The zvs winding Nzvs is coupled to a node between the series-coupled first and second diodes Dzvs1, Dzvs2. The zero voltage switching circuit 420 still further includes a zvs inductor (auxiliary inductor) Lzvs and a zvs capacitor (auxiliary capacitor) Czvs coupled in series with the zvs winding Nzvs.

The switching circuit 400 operates as follows. During the interval 1-D, an input current flows through the primary winding N1, the body diode DM2 and the first capacitor C1. At the same time, there is a second current flowing through the body diode DM2, the first diode Dzvs1, the zvs winding Nzvs, the zvs inductor Lzvs and the zvs capacitor Czvs. A difference between the input current and the second current thus flows through the body diode DM2. When the current through the body diode DM2 is about zero, the clamping switch M2 may be closed. Then, when the clamping switch is open, the difference between the input current and the second current will resonantly discharge a drain-source capacitance of the power switch M1. As a voltage across the power switch M1 is reduced to about zero, the power switch M1 may be closed with substantially zero volts thereacross. Energy stored in the zvs inductor Lzvs may now be transferred to the output through the zvs winding Nzvs, the second diode Dzvs2 and the zvs capacitor Czvs.

Turning now to FIG. 4B, illustrated is a schematic diagram of another embodiment of a switching circuit 450 constructed in accordance with the principles of the present invention. The switching circuit 450 is similar to the switching circuit 400 illustrated and described with respect to FIG. 4A, but employs a different zero voltage switching circuit 460.

The zero voltage switching circuit 460 includes a first diode Dzvs1 series-coupled to a zvs winding (auxiliary winding) Nzvs of a transformer T1. The zero voltage switching circuit 460 further includes a second diode Dzvs2 coupled between the zvs winding Nzvs and a node between the clamping switch M1 and the first capacitor C1. The zero voltage switching circuit 460 still further includes a series-coupled zvs inductor (auxiliary inductor) Lzvs and zvs capacitor (auxiliary capacitor) Czvs coupled across the second diode Dzvs2.

The switching circuit 450 operates as follows. Analogous to the switching circuit 400, the zvs inductor Lzvs is charged by a current flowing through the first diode Dzvs1, the zvs winding Nzvs, the zvs inductor Lzvs, the zvs capacitor Czvs and the first capacitor C1. The zvs inductor Lzvs is discharged, however, by a current flowing through the zvs capacitor Czvs, the zvs inductor Lzvs and the second diode Dzvs2. As a result, the zvs winding Nzvs is removed from the discharge path.

Figure 5:
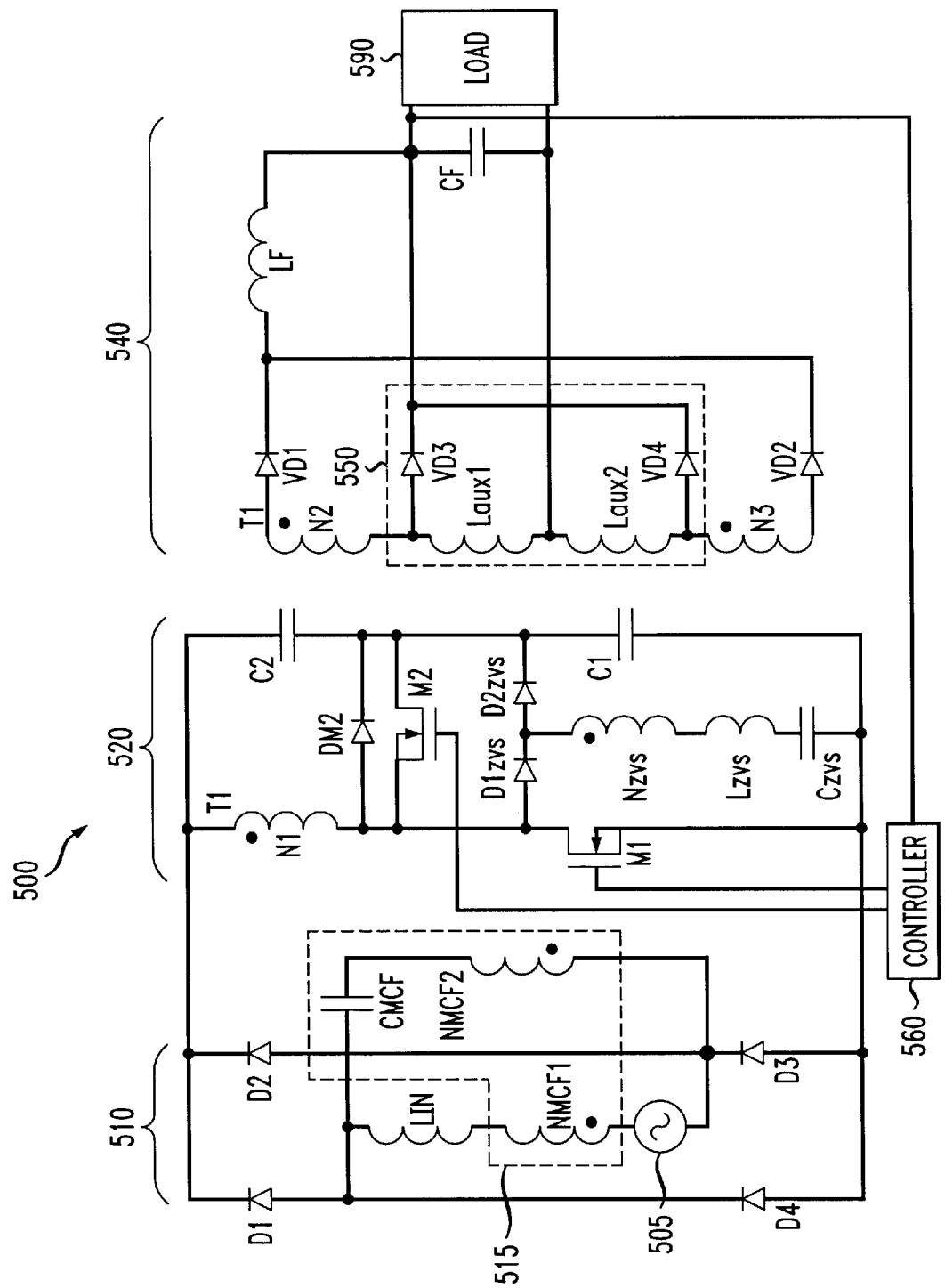
FIG. 5 illustrates a schematic diagram of another embodiment of a single stage power factor corrector constructed in accordance with the principles of the present invention.

Turning now to FIG. 5, illustrated is a schematic diagram of another embodiment of a single stage power factor corrector 500 constructed in accordance with the principles of the present invention. The power factor corrector 500 has an input couplable to a source of AC power 505 and an output couplable to a load 590. The power factor corrector 500 includes an input rectifier 510 (e.g., a full bridge rectifier) that rectifies AC power (from the source of AC power 505). The power factor corrector 500 further includes a magnetically coupled filter 515. The magnetically coupled filter 515 advantageously controls currents through an input inductor Lin, resulting in reduced high frequency ripple in the input current. The power factor corrector 500 further includes a switching circuit 520 coupled between the input rectifier 510 and a primary winding N1 of a transformer T1. The power factor corrector 500 further includes an output circuit 540 coupled to first and second secondary windings N2, N3 of the transformer T1. A controller 560 monitors an output voltage Vout (or an output current) at the output of the power factor corrector 500 and operates the switching circuit 520 to regulate the output of the power factor corrector 500 and to correct a power factor of the AC power.

Figure 6:
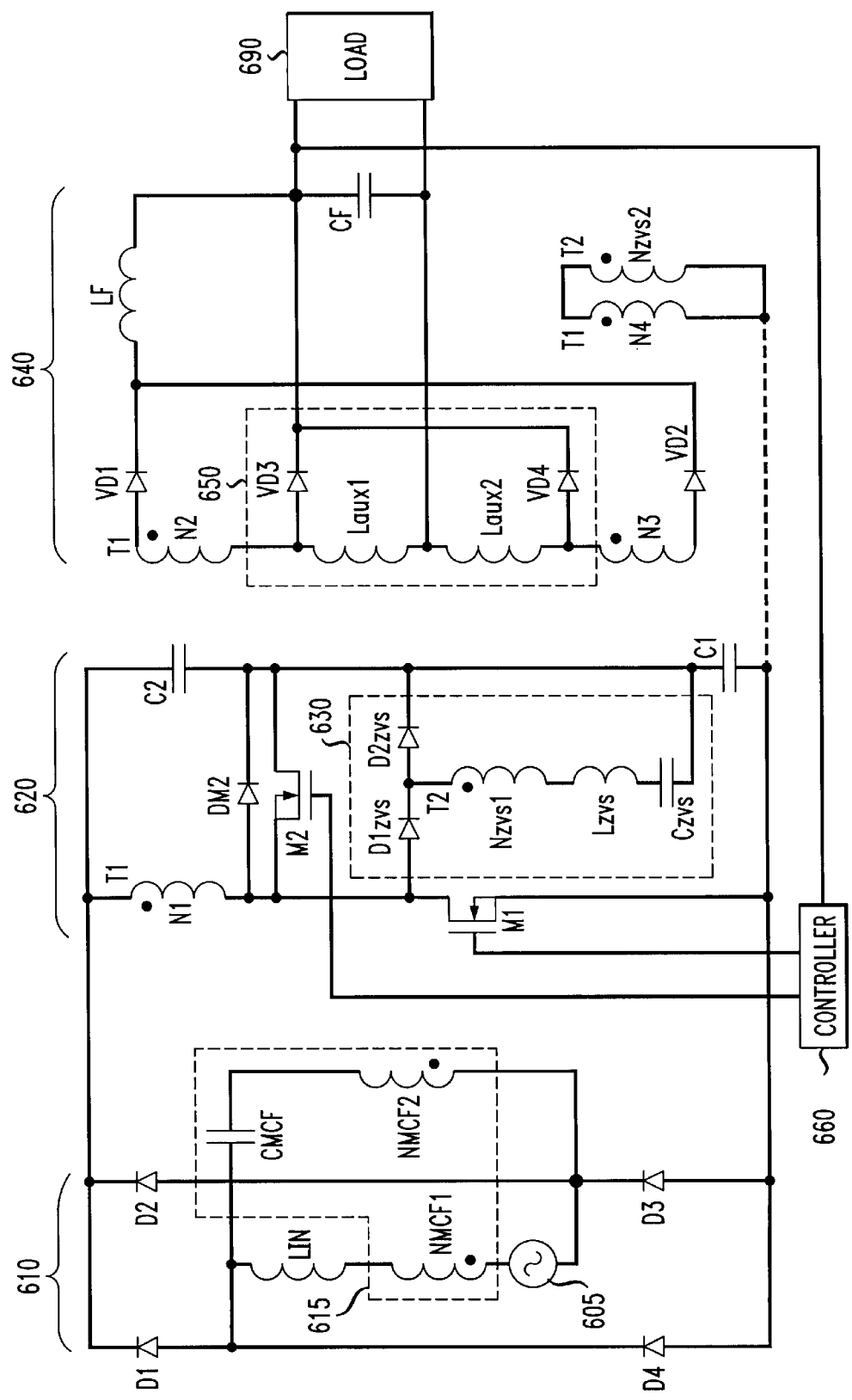
FIG. 6 illustrates a schematic diagram of yet another embodiment of a single stage power factor corrector constructed in accordance with the principles of the present invention.

Turning now to FIG. 6, illustrated is a schematic diagram of yet another embodiment of a single stage power factor corrector 600 constructed in accordance with the principles of the present invention. The power factor corrector 600 is similar to the power factor corrector 500 illustrated and described with respect to FIG. 5 but includes an additional transformer T2.

While the zvs winding Nzvs of FIG. 5 is a winding of the transformer T1, in some applications wherein an input voltage to the power factor corrector 500 may be high, a voltage across even one turn of the transformer T1 may be too high to be employed in a zero voltage switching circuit. In the illustrated embodiment, the power factor corrector 600 employs a second transformer T2 that scales the voltage down to a voltage adequate for use with a zero voltage switching circuit 630.

Those skilled in the art should understand that the previously described embodiments are submitted for illustrative purposes only and that other embodiments are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies. For a better understanding of a variety of power converter topologies, see *Modern DC-to-DC Switchmode Power Converter Circuits*, by Rudolph P. Severns and Gordon Bloom, Van Nostrand Reinhold Company, New York, N.Y. (1985), which is incorporated herein by reference in its entirety.

Although the present invention has been described in detail, those skilled in the art should understand that they can make various changes, substitutions and alterations herein without departing from the spirit and scope of the invention in its broadest form.

What is claimed is:

1. A switching circuit for use with a power converter, comprising:
   a power switch coupled to a primary winding of a transformer; and
   an active clamp coupled to said power switch and including:
      series-coupled first and second capacitors, coupled across said power switch and said primary winding, having opposing polarities thereacross, and
      a clamping switch coupled to a node between said series-coupled first and second capacitors, said clamping switch configured to open to allow energy stored in said first capacitor to be transferred to an output of said power converter via said second capacitor, said clamping switch configured to close to allow energy stored in said second capacitor to be transferred to said output.

2. The switching circuit as recited in claim 1 wherein said first capacitor is substantially larger than said second capacitor.

3. The switching circuit as recited in claim 1 wherein said active clamp comprises an input inductor, said second capacitor and said input inductor configured to form a resonant circuit to regulate an input current of said power converter.

4. The switching circuit as recited in claim 1 wherein said active clamp comprises an input inductor, said input inductor and said first and second capacitors being configured to deliver energy to said primary winding to maintain output regulation of said power converter.

5. The switching circuit as recited in claim 1 wherein said active clamp comprises an input inductor, said input inductor and said first and second capacitors being configured to deliver energy to said primary winding to allow said input inductor to operate with continuous current therethrough.

6. The switching circuit as recited in claim 1 wherein said active clamp further comprises a zero voltage switching circuit coupled across said clamping switch and configured to enable zero voltage switching of said clamping switch.

7. The switching circuit as recited in claim 6 wherein said zero voltage switching circuit, comprises:
series-coupled first and second diodes;
an auxiliary winding of said transformer coupled to a node between said series-coupled first and second diodes; and
an auxiliary inductor and an auxiliary capacitor coupled in series with said auxiliary winding.

8. The switching circuit as recited in claim 6 wherein said zero voltage switching circuit, comprises:
a first diode;
an auxiliary winding of said transformer coupled in series to said first diode;
a second diode coupled between said auxiliary winding and a node between said clamping switch and said first capacitor; and
a series-coupled auxiliary inductor and auxiliary capacitor coupled across said second diode.

9. The switching circuit as recited in claim 1 wherein said power switch and said clamping switch are complementarily switched.

10. A method of processing power for a power converter, comprising:
modulating a power switch to couple a primary winding of a transformer to a source of input energy; and
clamping energy in said primary winding, including:
opening a clamping switch, coupled to a node between series-coupled first and second capacitors having opposing polarities thereacross, to allow energy stored in said first capacitor to be transferred to said output via said second capacitor, and
closing said clamping switch to allow energy stored in said second capacitor to be transferred to said output.

11. The method as recited in claim 10 wherein said first capacitor is substantially larger than said second capacitor.

12. The method as recited in claim 10 further comprising employing a resonant circuit formed by an input inductor and said second capacitor to regulate an input current of said power converter.

13. The method as recited in claim 10 further comprising employing an input inductor and said first and second capacitors to deliver energy to said primary winding to maintain output regulation of said power converter.

14. The method as recited in claim 10 further comprising employing an input inductor and said first and second capacitors to deliver energy to said primary winding to allow said input inductor to operate with continuous current therethrough.

15. The method as recited in claim 10 wherein said clamping further comprises employing a zero voltage switching circuit that enables said clamping switch to be switched with substantially zero volts thereacross.

16. The method as recited in claim 15 wherein said zero voltage switching circuit, comprises:
series-coupled first and second diodes;
an auxiliary winding of said transformer coupled to a node between said series-coupled first and second diodes; and
an auxiliary inductor and an auxiliary capacitor coupled in series with said auxiliary winding.

17. The method as recited in claim 15 wherein said zero voltage switching circuit, comprises:
a first diode;
an auxiliary winding of said transformer coupled in series to said first diode;
a second diode coupled between said auxiliary winding and a node between said clamping switch and said first capacitor; and
a series-coupled auxiliary inductor and auxiliary capacitor coupled across said second diode.

18. The method as recited in claim 10 further comprising complementarily switching said power switch and said clamping switch.

19. A single stage power factor corrector, comprising:
an input rectifier couplable to a source of input energy;
a switching circuit coupled to said input rectifier and including:
a power switch coupled to a primary winding of a transformer, and
an active clamp coupled to said power switch and including:
series-coupled first and second capacitors, coupled across said power switch and said primary winding, having opposing polarities thereacross, and
a clamping switch coupled to a node between said series-coupled first and second capacitors, said clamping switch opening to allow energy stored in said first capacitor to be transferred to an output of said power factor corrector via said second capacitor, said clamping switch closing to allow energy stored in said second capacitor to be transferred to said output;
an output rectifier coupled to said secondary winding of said transformer; and
an output filter coupled to said output of said power factor corrector.

20. The power factor corrector as recited in claim 19 wherein said first capacitor is substantially larger than said second capacitor.

21. The power factor corrector as recited in claim 19 wherein said active clamp comprises an input inductor, said second capacitor and said input inductor forming a resonant circuit to regulate an input current of said power converter.

22. The power factor corrector as recited in claim 19 wherein said active clamp comprises an input inductor, said input inductor and said first and second capacitors cooperating to deliver energy to said primary winding to maintain output regulation of said power converter.

23. The power factor corrector as recited in claim 19 wherein said active clamp comprises an input inductor, said input inductor and said first and second capacitors cooperating to deliver energy to said primary winding to allow said input inductor to operate with continuous current therethrough.

24. The power factor corrector as recited in claim 19 wherein said active clamp further comprises a zero voltage switching circuit, coupled across said clamping switch, that enables zero voltage switching of said clamping switch.

25. The power factor corrector as recited in claim 24 wherein said zero voltage switching circuit, comprises:

series-coupled first and second diodes;

an auxiliary winding of said transformer coupled to a node between said series-coupled first and second diodes; and an auxiliary inductor and an auxiliary capacitor coupled in series with said auxiliary winding.

26. The power factor corrector as recited in claim 24 wherein said zero voltage switching circuit, comprises:

a first diode;

an auxiliary winding of said transformer coupled in series to said first diode;

a second diode coupled between said auxiliary winding and a node between said clamping switch and said first capacitor; and a series-coupled auxiliary inductor and auxiliary capacitor coupled across said second diode.

27. The power factor corrector as recited in claim 19 wherein said power switch and said clamping switch are complementarily switched.

28. The power factor corrector as recited in claim 19 wherein said power factor corrector is free of a post regulator.

* * * * *